United States Patent
Sachtjen (10) Patent No.: US 11,641,332 B2
(45) Date of Patent: *May 2, 2023

(54) AUTHENTICATION AND CONFIDENCE MARKING E-MAIL MESSAGES

(71) Applicant: Iconix, Inc., San Jose, CA (US)

(72) Inventor: Scott A. Sachtjen, San Jose, CA (US)

(73) Assignee: Iconix, Inc., San Jose, CA (US)

(*) Notice: Subject to any disclaimer, the term of this patent is extended or adjusted under 35 U.S.C. 154(b) by 416 days.

This patent is subject to a terminal disclaimer.

(21) Appl. No.: 16/710,984

(22) Filed: Dec. 11, 2019

(65) Prior Publication Data
US 2020/0358733 A1 Nov. 12, 2020

Related U.S. Application Data

(63) Continuation of application No. 16/132,251, filed on Sep. 14, 2018, now Pat. No. 10,541,956, which is a continuation of application No. 12/024,980, filed on Feb. 1, 2008, now Pat. No. 10,110,530.

(60) Provisional application No. 60/899,064, filed on Feb. 2, 2007.

(51) Int. Cl.
| | |
|---|---|
| *H04L 29/06* | (2006.01) |
| *H04L 51/212* | (2022.01) |
| *H04L 51/00* | (2022.01) |
| *H04L 9/40* | (2022.01) |
| *H04L 9/12* | (2006.01) |
| *H04L 41/026* | (2022.01) |
| *H04L 65/70* | (2022.01) |

(52) U.S. Cl.
CPC .............. *H04L 51/212* (2022.05); *H04L 9/12* (2013.01); *H04L 41/026* (2013.01); *H04L 51/00* (2013.01); *H04L 63/10* (2013.01); *H04L 63/126* (2013.01); *H04L 65/70* (2022.05)

(58) Field of Classification Search
CPC ......... H04L 51/212; H04L 65/70; H04L 9/12; H04L 41/026; H04L 51/00; H04L 63/10; H04L 63/126; H04W 12/06
See application file for complete search history.

(56) References Cited

U.S. PATENT DOCUMENTS

| | | | | |
|---|---|---|---|---|
| 2004/0255037 | A1* | 12/2004 | Corvari | H04L 9/3263 709/201 |
| 2005/0216587 | A1* | 9/2005 | John | H04L 63/101 709/225 |
| 2006/0004896 | A1* | 1/2006 | Nelson | G06Q 10/107 |
| 2006/0015563 | A1* | 1/2006 | Judge | H04L 51/212 709/206 |

* cited by examiner

*Primary Examiner* — Yogesh Paliwal (57) ABSTRACT

Methods and systems for authenticating and confidence marking e-mail messages are described. One embodiment describes a method of authenticating an e-mail message. This method involves extracting a plurality of e-mail headers associated with the e-mail message, and identifying a sending edge mail transfer agent (MTA). The method then calls for determining if the sending edge MTA is authorized to send the e-mail message.

22 Claims, 7 Drawing Sheets

Flowchart 700

FIG. 1

Network 200

Flowchart 400

Network 600

FIG. 6

Flowchart 700

FIG. 7

AUTHENTICATION AND CONFIDENCE MARKING E-MAIL MESSAGES

This application is a continuation of U.S. patent application Ser. No. 16/132,251, filed on Sep. 14, 2018 on behalf of first-named inventor Scott A. Sachtjen for "Authenticating and Confidence Marking E-Mail Messages," which in turn is a continuation of U.S. patent application Ser. No. 12/024,980, filed on Feb. 1, 2008 on behalf of first-named inventor Scott A. Sachtjen for "Authenticating And Confidence Marking E-Mail Messages" (issued on Oct. 23, 2018 as U.S. patent Ser. No. 10/110,530), which in turn claims the benefit of U.S. Provisional Application No. 60/899,064, filed on Feb. 2, 2007 on behalf of first-named inventor Scott A. Sachtjen for "A Method And System For Authentication And Confidence Marking Of Third-Party E-Mail Messages;" each of these prior applications is incorporated herein in its entirety.

BACKGROUND

Field of the Invention

Embodiments of the present invention relate to authenticating e-mail messages.

Related Art

One major concern in the field of electronic commerce is the need to identify and verify communications between parties. For example, when a customer is engaged in an e-commerce transaction with their bank, it is important to both the customer and the bank that the customer be able to identify and trust e-mail received from the bank. This concern is further complicated by third-party transactions, where a third party sends a message on behalf of someone else, such as where an online payment entity sends an e-mail to a customer on behalf of a seller.

A number of technologies, such as SPF (sender policy framework; RFC 4408) and Sender ID (RFC 4406), have been developed to help verify e-mail exchanged between servers or MTAs (mail transfer agents). Generally, these technologies are used to help ensure that the identifying information included in an e-mail's headers correlates with the sending MTA. However, these technologies do not address the problem of legitimate yet fraudulent senders; for example, an e-mail sent from YourOnlineBank.com (with the number "0") may comply with all of the necessary standards, but a user receiving that e-mail may easily confuse it for a legitimate e-mail from YourOnlineBank.com (with the letter "O").

The existing standards are set up to help prevent e-mail with forged header information from reaching the end user. However, the current standards do not protect the user from fraudulent e-mail with correct, but misleading, header information. Further, the current standards do not provide the user with any indicator of an e-mail which is authentic and trustworthy, as the current standards do not test for authenticity or trustworthiness.

SUMMARY

Methods and systems for authenticating and confidence marking e-mail messages are described. One embodiment describes a method of authenticating an e-mail message. This method involves extracting a plurality of e-mail headers associated with the e-mail message, and identifying a sending edge mail transfer agent (MTA). The method then calls for determining if the sending edge MTA is authorized to send the e-mail message.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in figures herein (e.g., FIG. 3) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing." "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

Basic Computing System

Figure 1:
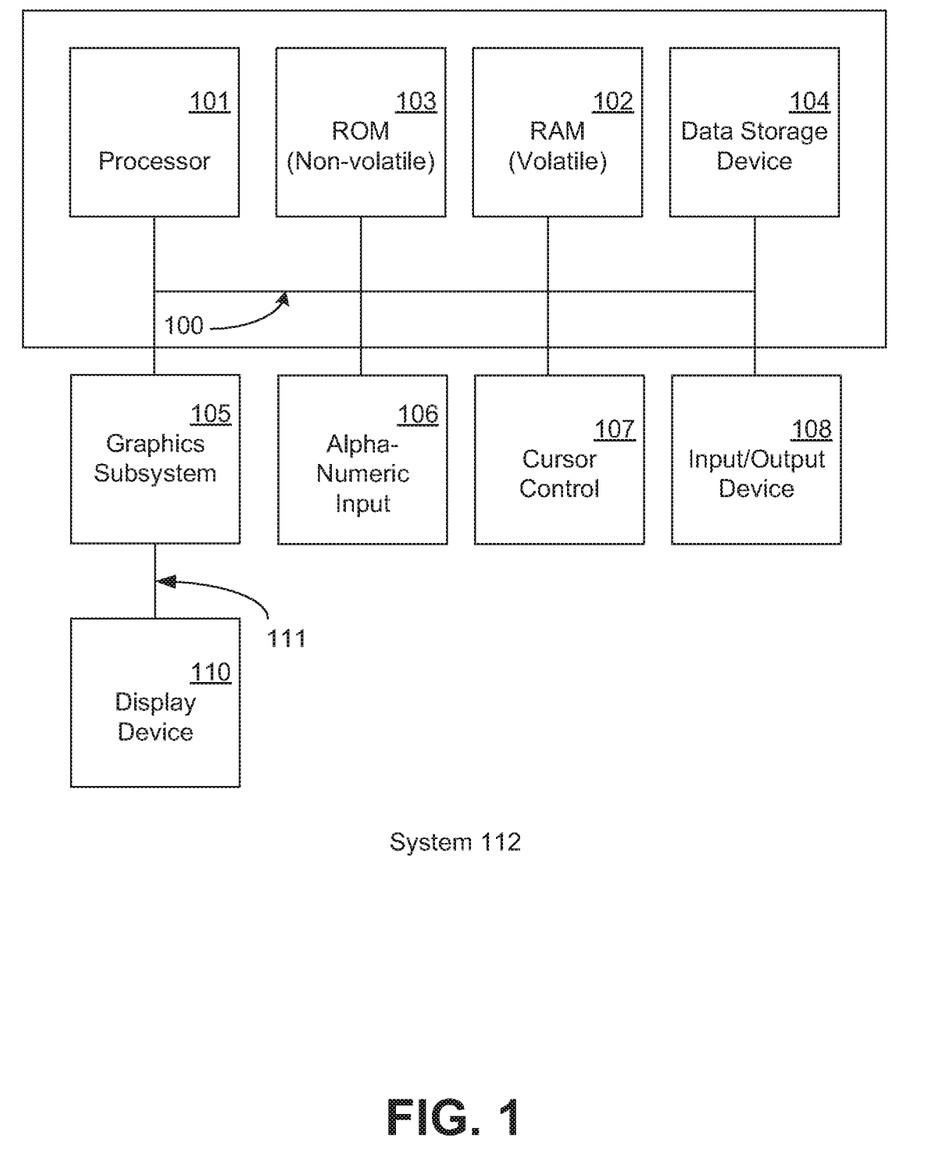
FIG. 1 is a block diagram of an exemplary computer system upon which embodiments of the present invention may be implemented.

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like. Similarly, system 112 can be implemented as ahandheld device (e.g., cellphone, etc.) or a set-top video game console device such as, for example, the Xbox-b, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

First- and Third-Party E-Mail Authentication

In the description that follows, several types of e-mail messages are discussed. First party e-mails are e-mails sent directly from one party to another; for example, in electronic commerce, an online bank may send electronic statements directly to its customers. Typically, the headers of the first party e-mail are in agreement. e.g., both the "From:" and "Sender:" header is reflect the same party.

By contrast, third-party e-mails are e-mails sent by one party on behalf of another party; for example, a bank customer may set up an electronic bill payment. When the funds are transferred to the intended recipient, the bank sends an e-mail to the recipient, on behalf of the customer, indicating the transaction. By its very nature, a third-party e-mail will often include competing or contradictory header information. The e-mail will typically be marked "From:" one party, e.g., the bank customer, while the "Sender:" indicator will reflect another party, e.g., the bank.

In the following embodiments, an approach is described for authenticating e-mail. In several of these embodiments, header information is extracted from a received e-mail message. This header information is transmitted to an authentication service, which attempts to determine whether the e-mail was sent by, and/or on behalf of, a trustworthy sender. If the service verifies the e-mail, the e-mail can be displayed to the user in a specified manner, such as with the inclusion of some confidence mark or icon, so that the user knows that the e-mail was sent by, or on behalf of, a trustworthy entity.

One of the advantages of such embodiments is that the recipient of the e-mail is presented with an indication of the trustworthiness of the e-mail in a manner in which they are accustomed. Rather than requiring the user to read and understand e-mail headers, most of which are commonly hidden from the user by default, the user can be presented with a visual indicator, such as an icon or company logo. This visual indicator can provide both confidence in the trustworthiness of the e-mail and an indication of the source of the e-mail, such as in the case where a company logo is displayed. In the following description, the term "confidence icon" is utilized to reference this idea of a visual indication of trustworthiness. However, it is understood that, in different embodiments, such a visual indicator can take many forms, including, but not limited to, icons, logos, other graphical indicators, or textual indicators.

Another advantage of the embodiments described herein is that certain senders may be "prequalified" or "vetted" by the authentication service. For example, an online payment facilitating company may often send third-party e-mails, e.g., payment receipts on behalf of a purchaser to a seller. If that online payment facilitating company is known to the authentication service, e.g., by inclusion in a database of trustworthy senders, their e-mail can be verified as trustworthy, which benefits both the payment facilitator and their clients.

Exemplary Networking Environments

Figure 2:
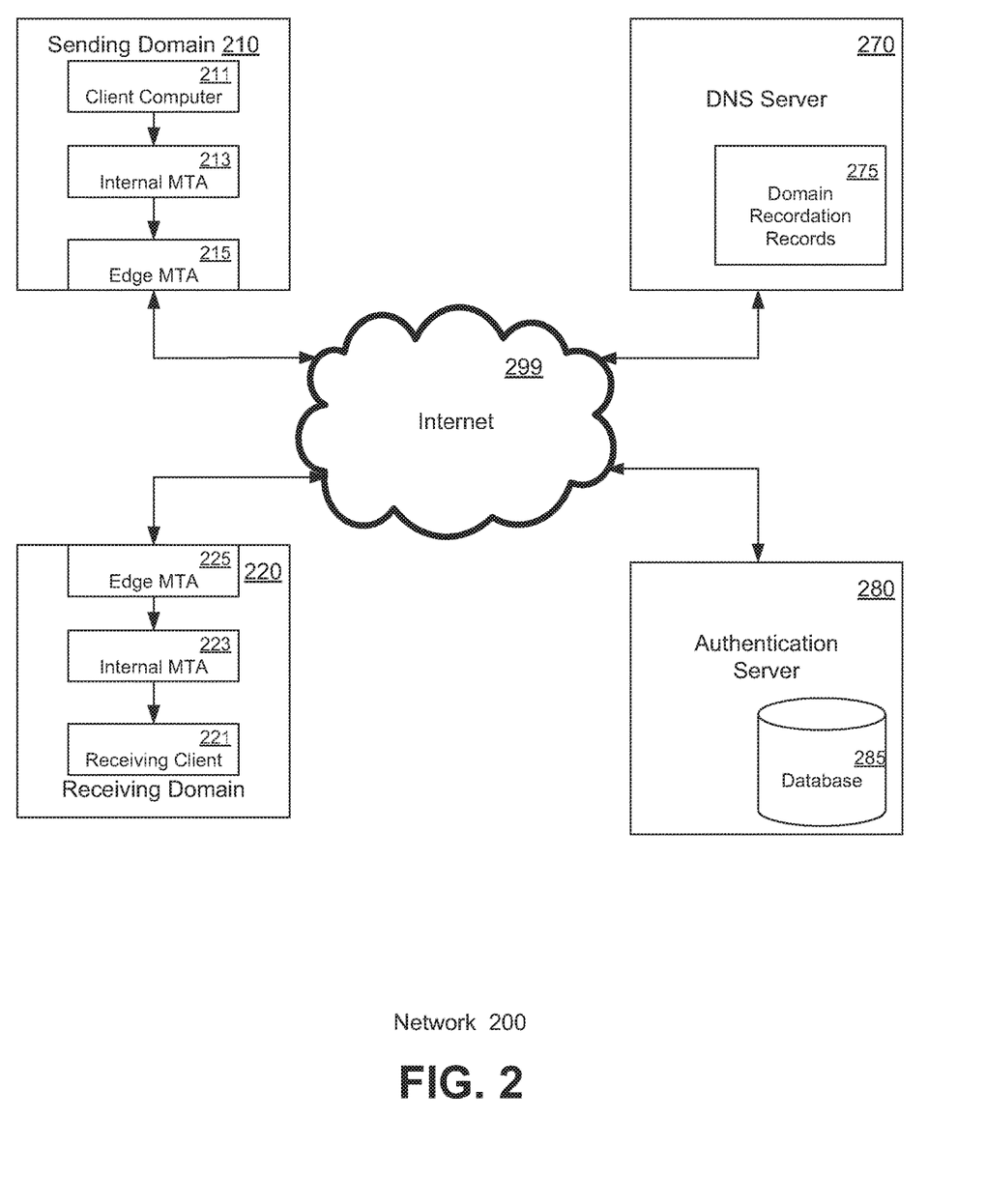
FIG. 2 is a block diagram of an exemplary networking environment, according to one embodiment.

With reference now to FIG. 2, an exemplary networking environment 200 is depicted, in accordance with one embodiment. While network 200 is depicted as incorporating specific, enumerated features and elements, it is understood that embodiments are well suited to applications involving additional, fewer, or different features, elements, or arrangements.

Network 200, as depicted in FIG. 2, is representative of the transactions which may occur during transmission and authentication of a first party e-mail, in one embodiment. For example, a user within the sending domain 210 uses client computer 211 to send an e-mail. The e-mail may pass through one or more internal MTAs (mail transfer agents) 213 within the sending domain 210, before it reaches edge MTA 215. The e-mail leaves sending domain 210 at edge MTA 215, and passes through Internet 299 before reaching receiving domain 220. The e-mail enters receiving domain 220 via edge MTA 225, and may pass through one or more internal MTAs 223, before reaching receiving client 221.

In some embodiments, once the e-mail is received, software on receiving client 221 attempts to authenticate the e-mail. Portions of the e-mail, e.g., selected portions of the e-mail headers, are passed to authentication service 280, which includes authentication database 285. In several such embodiments, authentication service 280 accesses DNS server 270 while attempting to authenticate the e-mail, and retrieves domain recordation records 275. One such embodiment is explored in greater detail below.

Figure 3:
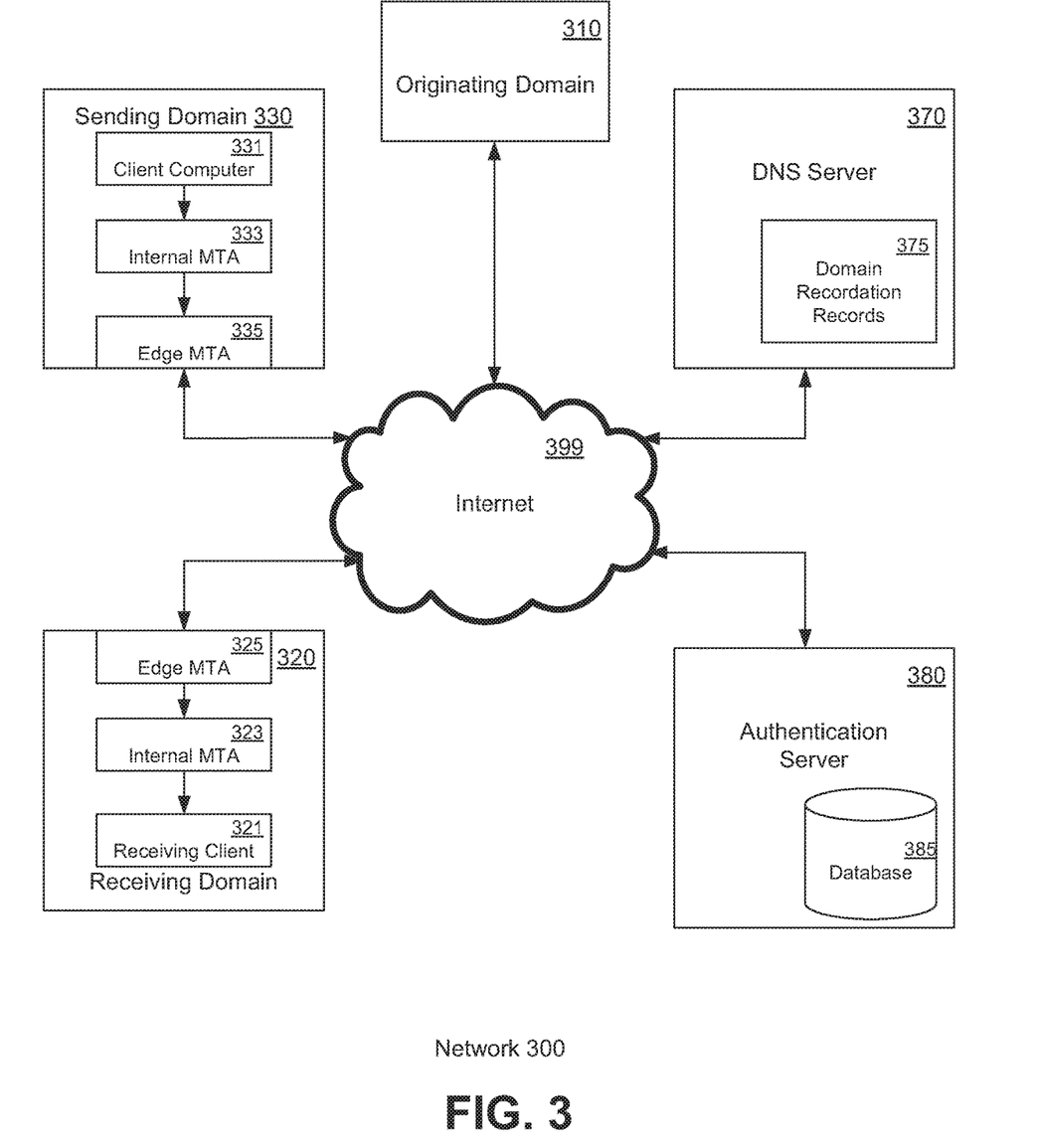
FIG. 3 is a block diagram of an exemplary networking environment, according to one embodiment.

With reference now to FIG. 3, an exemplary networking environment 300 is depicted, in accordance with one embodiment. While network 300 is depicted as incorporating specific, enumerated features and elements, it is understood that embodiments are well suited to applications involving additional, fewer, or different features, elements, or arrangements.

Network 300, as depicted in FIG. 3, is representative of the transactions which may occur during transmission and authentication of a third-party e-mail, in one embodiment. For example, a user within originating domain 310 may engage in some e-commerce transaction with a user within receiving domain 320. As a result of this transaction, a third-party sender within sending domain 330 may use client computer 331 to send an e-mail. The e-mail may pass through one or more internal MTAs 333 within the sending domain 330, before it reaches edge MTA 335. The e-mail leaves sending domain 330 at edge MTA 335, and passes through Internet 399 before reaching receiving domain 320. The e-mail enters receiving domain 320 via edge MTA 325, and may pass through one or more internal MTAs 323 before reaching receiving client 321.

In some embodiments, once the e-mail is received, software on receiving client 321 attempts to authenticate the e-mail. Portions of the e-mail, e.g., selected portions of the e-mail headers, are passed to authentication service 380, which includes authentication database 385. In several such embodiments, authentication service 380 accesses DNS server 370 while attempting to authenticate the e-mail, and retrieves domain recordation records 375. One such embodiment is explored in greater detail below.

E-Mail Authentication: Client Behavior

In some embodiments, specialized software executing on the receiving client is utilized to perform e-mail authentication. In some embodiments, the software may modify or otherwise "plug in" to an existing e-mail client. In other embodiments, a specialized e-mail client may be utilized. In some embodiments, some or all portions of the e-mail client and/or client authentication software may reside and/or execute on a remote system. It is understood that embodiments of the invention are well suited to applications involving distributing some or all of the computational tasks ascribed to either the client or the authentication server across local or network accessible computer systems. Further, is understood that embodiments of the invention are well suited to applications wherein some or all of the functionality ascribed to either the client or the authentication server may be consolidated.

Figure 4:
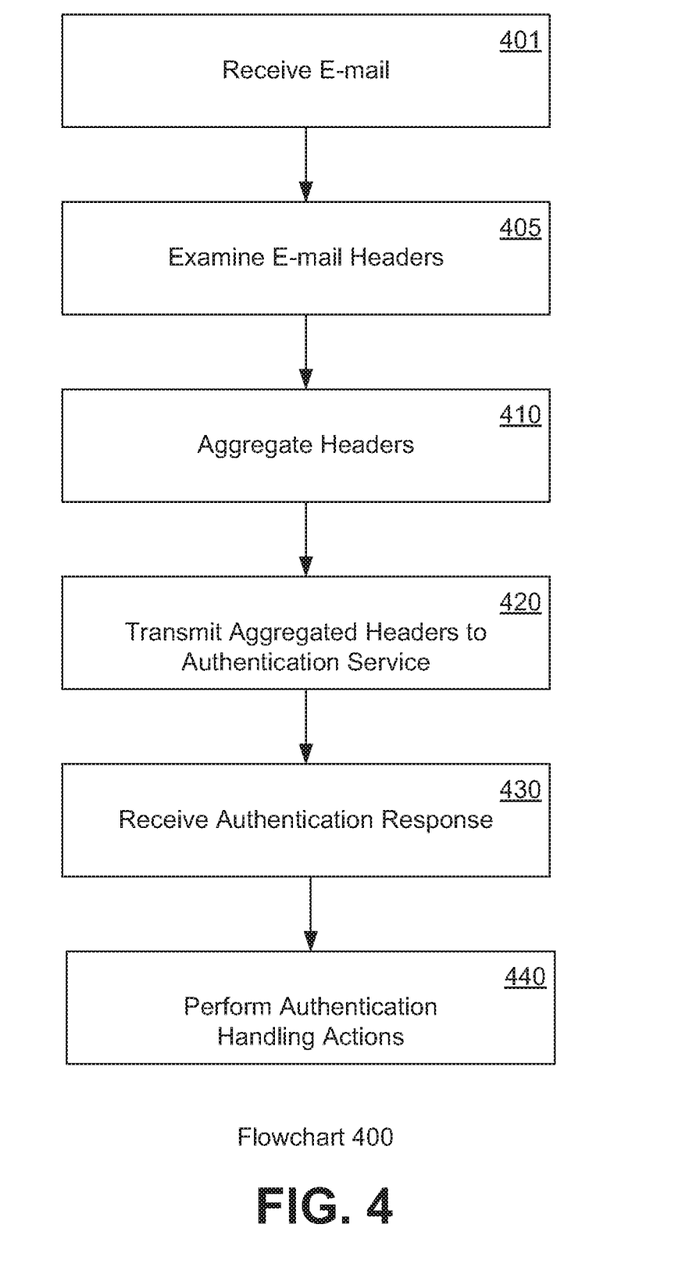
FIG. 4 is a flowchart of a method of e-mail authentication, according to one embodiment.

With reference now to FIG. 4, a flowchart 400 of a method of e-mail authentication is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 401, an e-mail is received. As is well known in the art, as e-mails are passed between MTAs, additional headers may be added. For example, each MTA may add a separate "Received:" to each e-mail that passes through the MTA. These "Received:" headers indicate each MTA involved in passing the message between the originator and the receiver. This header information is included in the received e-mail, although it may be hidden from the user.

For example, with reference to FIG. 3, receiving client 321 receives an e-mail from a third-party sender using client computer 331. Each MTA between client computer 331 and receiving client 321 adds an additional "Received:" header to the e-mail, including internal MTA 331, edge MTA 335, edge MTA 325, and internal MTA 323.

With reference now to step 405, in some embodiments, a portion of the e-mail headers are examined. In such an embodiment, the e-mail client may attempt to determine if the originator of the e-mail appears on the list of known senders, e.g., by examining the "Sender:" or "Reply-to:" headers. This approach allows the e-mail client to selectively screen e-mail before attempting authentication, e.g., by restricting authentication to e-mails which appear to be from entities which are of particular interest, such as banks or online payment facilitators, and excluding other e-mails. For example, the client will attempt to authenticate emails from "YourOnlineBank.com", while excluding those from "Your0nlineBank.com". This approach may also allow the e-mail client to selectively exclude e-mail from attempted authentication, e.g., by allowing a user to prevent authentication attempts on e-mail where trustworthiness is less of a concern, such as e-mail from a family member. In some embodiments, this step is omitted.

For example, the e-mail program for receiving client 321 may examine the headers in the e-mail from the third-party sender. If, for example, sending domain 330 appears in a list of senders to authenticate, the e-mail program will attempt to authenticate the e-mail.

With reference now to step 410, information contained in the e-mail headers is aggregated. In different embodiments, different headers are used by the authentication service. In this step, those headers that are of interest can be extracted from the e-mail, and prepared for transmission to the authentication service. Further, in some embodiments, redundant or duplicative headers can be excluded during this aggregation process.

For example, the e-mail client for receiving client 321 may extract the "Received:" headers, the "From:" header, and the "Sender:" header from the e-mail received from the third-party sender. These headers are encapsulated and prepared for transmission to authentication service 380.

With reference now to step 420, the aggregated e-mail headers are transmitted to the authentication server.

For example, the e-mail program transmits the aggregated headers from receiving client 321 to authentication server 380.

With reference now to step 430, an authentication response is received from the authentication service. In different embodiments, different actions may be specified by the authentication service. For example, the authentication response may include instructions for the e-mail program to retrieve a confidence icon relating to the sender of the e-mail, e.g., from a specified Internet location, and display it as part of the "From:" field for that e-mail. Alternatively, the e-mail program may be instructed to display a confidence icon indicating that the e-mail has been authenticated by the authentication service. If the authentication service was unable to authenticate the e-mail, the e-mail program may be instructed to display a different icon, or no icon at all. Additionally, the authentication response may include additional information, such as display directives, display signs, instructions regarding the location of additional information about the sender, instructions regarding the location of additional information about a third-party, authentication failure conditions, or authentication status.

For example, authentication server 380 instructs the e-mail program for receiving client 321 to retrieve a confidence icon, e.g., the company logo, corresponding to the identity of the third-party sender. This confidence icon is to be displayed in the "From:" field, when the e-mail is being viewed by a user.

With reference now to step 440, the receiving client performs the actions specified by the authentication service. In different embodiments, different actions may be performed. For example, if the authentication response indicates that a confidence icon is to be retrieved and displayed, the receiving client would retrieve the icon, e.g., from a local cache of icons, or from a specified network location, and display it as instructed by the authentication response.

For example, the e-mail program for receiving client 321 obtains the confidence icon (company logo) corresponding to the identity of the third-party sender from a location specified by authentication server 380, and displays the confidence icon as instructed.

E-Mail Authentication: Authentication Service

In some embodiments, an authentication service is utilized to provide authentication for e-mail. The components and configuration of such an authentication service may vary, across different embodiments. In some embodiments, the authentication service is configured to receive authentication requests from client software, attempt to authenticate the e-mail messages described in his authentication requests, and transmit authentication responses to client software.

Figure 5:
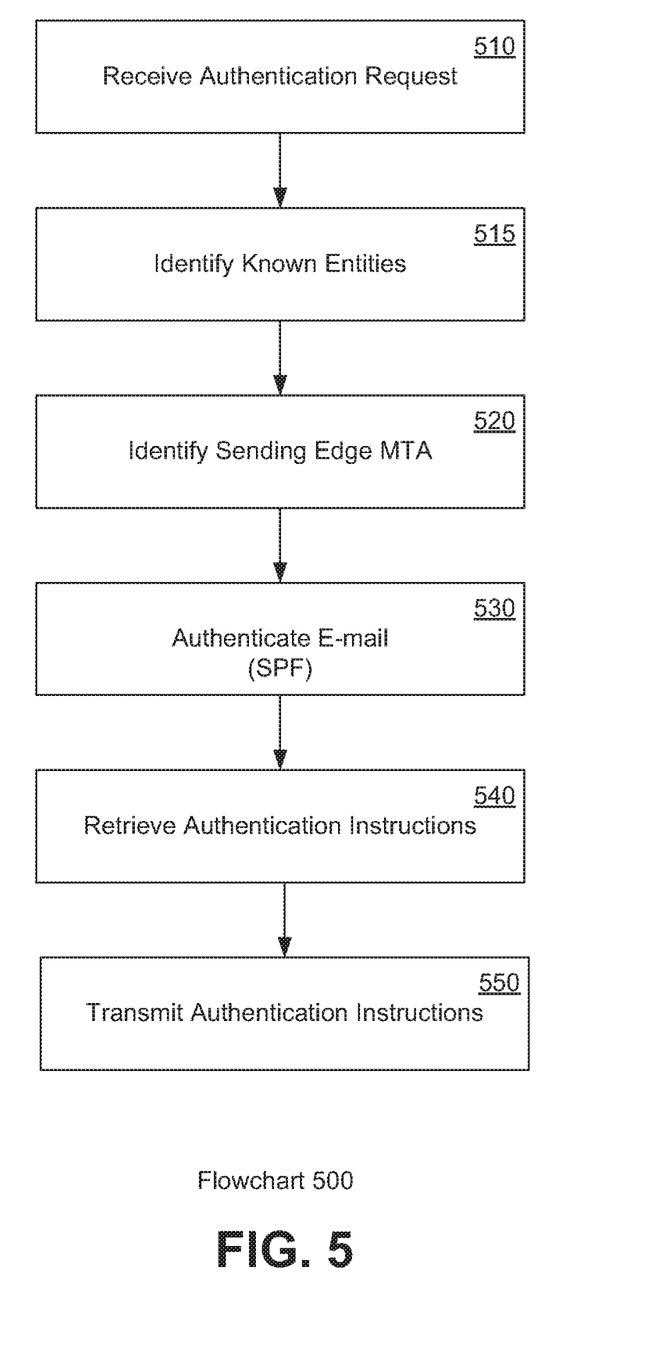
FIG. 5 is a flowchart of a method of e-mail authentication, according one embodiment.

With reference now to FIG. 5, a flowchart 500 of a method of e-mail authentication is depicted, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference now to step 510, an authentication request is received. In some embodiments, as previously described, client software executing on a client computer may prepare an authentication request. These requests may include one or more e-mails to be authenticated, and may include some portion of the headers corresponding to these e-mail messages. In different embodiments, different formats and protocols may be utilized for transmitting and receiving these authentication requests.

For example, authentication server 380 receives an authentication request from receiving client 321, regarding an e-mail sent by client computer 301 within sending domain 330. The authentication request includes the "Received:" headers from the e-mail, as well as the "From:" and "Sender:" headers.

With reference now to step 515, the authentication server determines if a known entity is involved. For example, in some embodiments, the authentication server maintains a list or database of known, trustworthy entities. If these entities are purportedly involved in an authentication request, e.g., a known entity appears in the "Sender." or the "From:" headers, the authentication server will attempt to authenticate the e-mail. In some embodiments, the authentication server attempt to match a specific user, e.g., "knownuser@trustworthy.com". In other embodiments, the authentication server attempts to match the domains involved, e.g., "trustworthy.com". In some embodiments, the authentication server attempts to match first a specific user, and attempt to match the domains if no specific user match is found. Moreover, in some embodiments, the authentication server may not perform authentication if no match is found.

For example, authentication server 380 attempts to match the "From:" and "Sender:" headers from the authentication request to a list of known entities maintained in database 385. If either originating domain 310 or sending domain 330 (or both) appears in database 385, authentication server 380 attempt to authenticate the e-mail.

With reference now to step 520, the sender's edge MTA is identified. As previously discussed, each MTA that an e-mail passes through adds an additional "Received:" header to the e-mail. By examining these headers, the edge transactions can be identified, e.g., those transactions where the e-mail was passed from an MTA for one domain to an MTA for a second domain. Identifying these edge transitions allows the authentication service to determine whether the sending edge MTAs are permitted to send e-mail on behalf of a trustworthy entity.

For example, authentication server 380 examines the headers included in the authentication request, in order to identify the sender's edge MTA. Here, authentication server 380 identifies edge MTA 335.

With reference now to step 530, the authentication service attempts to authenticate the e-mail. In some embodiments, the authentication server performs an SPF (sender policy framework) check to attempt to authenticate the e-mail. The DNS records corresponding to the involved domains are retrieved, and compared to the edge MTA previously identified. In the case of first party e-mail, if the edge MTA is identified as being allowed to send e-mail on behalf of the entity identified by the e-mail headers, e.g., in the "Sender." or "From:" headers, the e-mail is authenticated. In the case of third-party e-mail, if the edge MTA is identified as being allowed to send e-mail on behalf of either entity identified in the "Sender" or "From:" headers, the e-mail is authenticated. If, however, the edge MTA is not identified in the corresponding DNS records as permitted to send e-mail on behalf of a trustworthy entity, the authentication attempt may fail.

It is understood that in other environments, other authentication techniques may be utilized. For example, a "Sender ID" check may be performed; similarly, domainkeys identified mail may be authenticated in a manner similar to that described herein.

For example, authentication server 380 retrieves DNS records 375 from DNS server 370 corresponding to both originating domain 310 and sending domain 330. If DNS records 375 indicate that edge MTA 335 is permitted to send e-mail on behalf of originating domain 310 or sending domain 330, the e-mail is authenticated.

With reference now to step 540, the authentication service retrieves authentication instructions. In different embodiments, different authentication results may result in different authentication instructions. For example, if an e-mail is identified as coming from a trustworthy sender, different authentication instructions may be used and if the e-mail is identified as being on behalf of a trustworthy third party. Further, different trustworthy entities may have different desired authentication instructions, e.g., in terms of which confidence icons to utilize, where to retrieve confidence icons, how to display them, or the like. Similarly, if authentication is unsuccessful, different authentication instructions may be sent to the client.

For example, authentication server 380 retrieves authentication instructions corresponding to sending domain 330 from database 385.

With reference to step 550, the authentication server transmits authentication instructions in response to the authentication request. The retrieved authentication instructions are transmitted to the requesting client, instructing the client on how to proceed. As noted previously, formats and protocols utilized in receiving and transmitting authentication instructions may vary, across different embodiment.

For example, authentication server 380 transmits authentication instructions to receiving client 321, regarding how to handle the e-mail received from client computer 331.

Remote Validation and Client-Based Authentication

As discussed previously, in different embodiments, in different portions of the authentication functionality may be performed by different computing entities. In one embodiment, for example, a remote validation server is used for identifying known entities and forwarding validation responses, while the receiving client is used to perform the actual authentication of an e-mail message.

Figure 6:
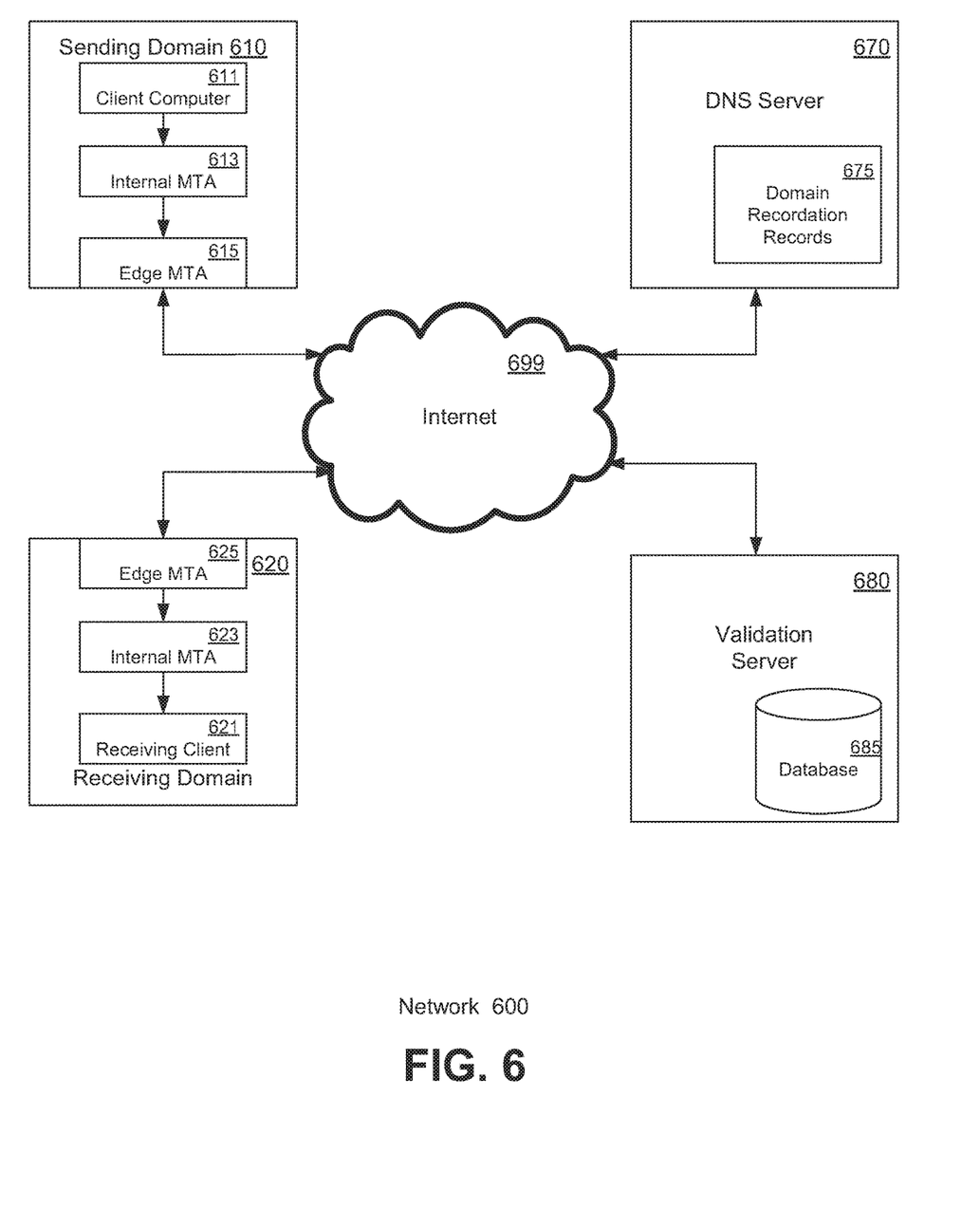
FIG. 6 is a block diagram of an exemplary networking environment, according to one embodiment.

With reference now to FIG. 6, an exemplary networking environment 600 is depicted, in accordance with one embodiment. While network 600 is depicted as incorporating specific, enumerated features and elements, it is understood that embodiments are well suited to applications involving additional, fewer, or different features, elements, or arrangements.

Network 600, as depicted in FIG. 6, is representative of the transactions which may occur during transmission and authentication of a first party e-mail, in one embodiment. For example, a user within the sending domain 610 uses client computer 611 to send an e-mail. The e-mail may pass through one or more internal MTAs (mail transfer agents) 613 within the sending domain 610, before it reaches edge MTA 615. The e-mail leaves sending domain 610 at edge MTA 615, and passes through Internet 699 before reaching receiving domain 620. The e-mail enters receiving domain 620 via edge MTA 625, and may pass through one or more internal MTAs 623, before reaching receiving client 621.

In this embodiment, once the e-mail is received, software on receiving client 621 attempts to authenticate the e-mail. Portions of the e-mail, e.g., selected portions of the e-mail headers, are passed to validation service 680, which includes validation database 685. Validation service 680 returns validation responses to receiving client 621. Receiving client 621 then attempts to authenticate the e-mail message, e.g., by accessing DNS server 670 and retrieving domain recordation records 675. Depending upon the success of the authentication attempt, receiving client 621 may perform portions of the authentication instructions provided by validation service 680.

Figure 7:
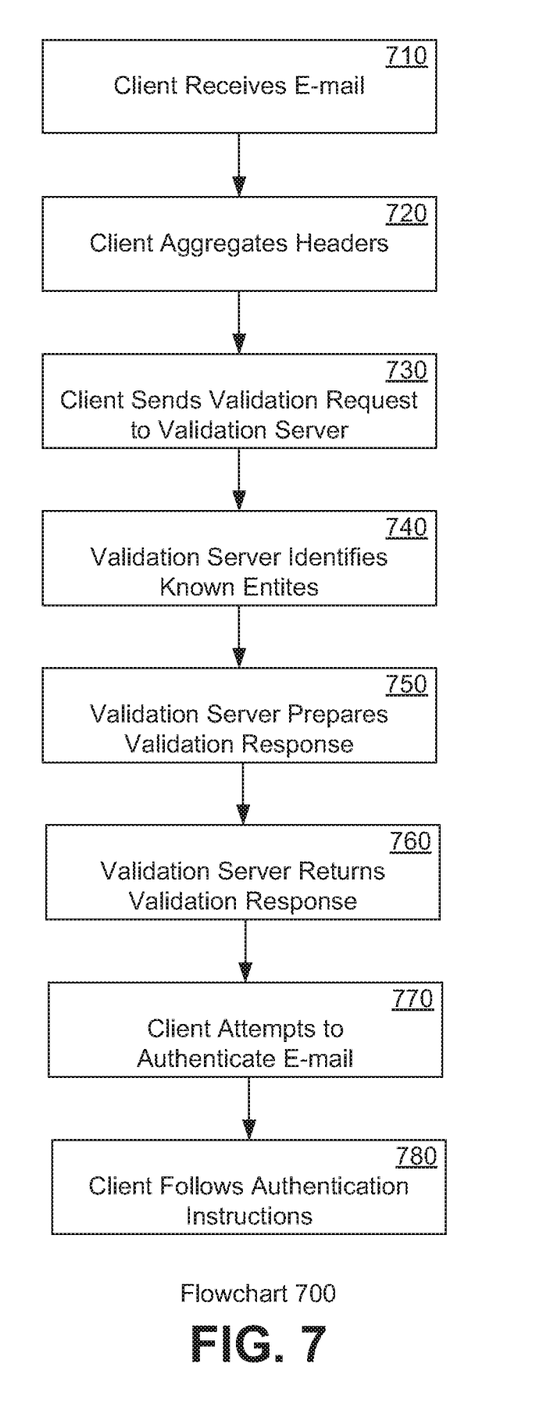
FIG. 7 is a flowchart of a method of the new authentication, according to one embodiment.

With reference now to FIG. 7, a flowchart 700 of a method of authenticating an e-mail message is depicted, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference now to step 710, a client receives an e-mail message. In different embodiments, different client software may be utilized on the receiving computer to handle e-mail authentication. In some embodiments, for example, e-mail authentication may be performed by a "helper" application, which coordinates with a separate e-mail program. In other embodiments, e-mail authentication may be included as part of an e-mail program.

For example, with reference to FIG. 6, receiving client 621 receives an e-mail from client computer 611.

With reference now to step 720, the client aggregates headers from the e-mail message. In some embodiments, the client may extract several different headers from an e-mail message, such as the "From:" or "Sender:" headers. Moreover, in some embodiments, the client may process multiple e-mail messages simultaneously. During this step, the client may take action to reduce redundancy or repetition of headers.

Continuing the preceding example, receiving client 621 extracts the "From:" and "Sender:" headers from the e-mail message received from client computer 611.

With reference now to step 730, the client transmits a validation request to a validation server. In this embodiment, the validation server provides remote validation of known entities, as well as providing authentication instructions for successful or failed tense to authenticate the e-mail, but does not attempt to authenticate the e-mail. As such, the validation request will include the aggregated headers produced during step 720, but is unlikely to include the "Received:" headers, as validation server does not intend to identify the sender's edge MTA.

Continuing the preceding example, receiving client 621 transmits a validation request to validation server 680, including the headers extracted from the e-mail message received from client computer 611.

With reference now to step 740, the validation server identifies known entities from the headers included in the validation request. In some embodiments, the validation server includes an authentication or validation database, which contains entries describing known, trustworthy entities. The validation server attempts to match the headers included in validation request with these known entities.

With reference now to step 750, the validation server prepares a validation response. In some embodiments, the validation response includes information regarding each entity described in the validation request, e.g., for each different entity identified in the headers included in the validation request, whether that entity is known, and how to handle authentication of the e-mail message. In some embodiment, the validation server can retrieve handling instructions corresponding to various known entities from the authentication database; alternatively, the validation server may generate such handling instructions. As discussed previously, these handling instructions may vary across different embodiments, but may include information such as the location and display instructions for confidence icons corresponding to identify known entities, or instructions on what the client to display if authentication is unsuccessful.

With reference now to step 760, the validation server transmits a validation response, in response to the validation request. The validation server returns the validation results to the requesting client, as well as appropriate handling instructions. As discussed previously, the formats and protocols utilized in transmissions between the requesting client and the validation or authentication server may vary, across different embodiments.

Continuing the preceding example, validation server 680 attempts to identify known entities from the validation request provided by receiving client 621. Validation server 680 accesses validation database 685, and attempts to match users and/or domains identified in the headers included in the validation request with a list of known entities included database 605. Validation server 680 also prepares a validation response for receiving client 621, including the location of and display instructions for a confidence icons corresponding to sending domain 610.

With reference now to step 770, the client attempts to authenticate the e-mail message. In different embodiments, different approaches may be utilized for authentication. In one embodiment, for example, the client identifies the sender's edge MTA from the "Received:" headers included in the e-mail message. The client then performs a sender policy framework (SPF) check, to determine if that MTA is permitted to send e-mail for, or on behalf of, one of the known entities identified by the validation server.

With reference now to step 780, the client follows the handling instructions provided by the validation server. In some embodiments, the handling instructions transmitted by the validation server instruct the client on what actions to perform if authentication is successful, as well as any special actions to take if authentication is unsuccessful. In one embodiment, if authentication succeeds, the client is instructed to display a confidence icon in a manner so as to indicate to a user that this e-mail message has been authenticated, e.g., the client may retrieve a confidence icon associated with a trusted entity, and display it within the "From:" field of the displayed e-mail.

Continuing the preceding example, receiving client 621 attempts to validate the message received from client computer 611. The "Received:" headers included in the e-mail message are parsed, and edge MTA 615 is identified. Receiving client 621 then performs an SPF check, by accessing DNS server 670 and domain recordation records 675 to determine if edge MTA 615 is authorized to send e-mail on behalf of sending domain 610. If edge MTA 615 is authorized, the e-mail message is successfully authenticated. Receiving client 621 may then retrieve a confidence icon corresponding to sending domain 610, e.g., a company logo from a specified location accessible through Internet 699, and display that confidence icon when the e-mail message is viewed by a user.

Embodiments of the present invention are thus described. While the present invention has been described in particular embodiments, it should be appreciated that the present invention should not be construed as limited by such embodiments, but rather construed according to the following claims.

What is claimed is:

1. A computer-implemented method, comprising:
receiving from a first party information representing a plurality of email headers associated with an email message received by the first party;
from the information, identifying a second party and a third party, wherein the email message purports to be sent by the third party to the first party on behalf of a second party;
retrieving an electronic record associated with the second party, and processing the electronic record to determine whether the electronic record explicitly identifies the third party as authorized to send email messages on behalf of the second party; and
in response to a determination that the electronic record explicitly identifies the third party as authorized to send email messages on behalf of the second party, transmitting a response to the first party that indicates that the third party is authorized to send the email message on behalf of the second party.

2. The computer-implemented method of claim 1, wherein the computer-implemented method further comprises authenticating the email message and responsively transmitting to the first party information indicating that the email message has been authenticated.

3. The computer-implemented method of claim 1, wherein the response comprises information to be displayed on a computer of the first party in association with at least one of an inbox listing of the first party and a display of content of the email message to the first party, where said information to be displayed conveys that the third party is verified as having been authorized to send the email message on behalf of the second party.

4. The computer-implemented method of claim 3, wherein receiving the information from the first party comprises receiving the information from the first party in a format that is encrypted and encapsulated, and wherein transmitting the response comprises transmitting the response to the first party in a format that is also encrypted and encapsulated.

5. The computer-implemented method of claim 3, wherein the information to be displayed on the computer of the first party comprises a confidence icon.

6. The computer-implemented method of claim 1, wherein:
identifying the third party further comprises comparing a name identified from the information representing the email headers with a list of registered, known senders to detect a look-alike mismatch between the name and one of the registered, known senders in the list, and identifying the third party as the one of the registered, known senders in the list; and
the computer-implemented method further comprises, in response to detection of the look-alike mismatch, transmitting a message to the first party which indicates at least one of (i) a result that the email message is un-verified, (ii) a look-alike mismatch has been detected, and (iii) the identity of the one of the registered, known senders in the list.

7. The computer-implemented method of claim 6, wherein the message indicates that the email message is un-verified and wherein the message comprises information to be displayed in association with at least one of (i) an inbox listing of the first party and (ii) a display of email content to the first party, where said information to be displayed conveys that the third party has not been verified as having been authorized to send the email message on behalf of the second party.

8. The computer-implemented method of claim 1, wherein the computer-implemented method further comprises, in association with the determination, retrieving from a database authentication instructions specific to the third party, and authenticating the email message in dependence on the authentication instructions specific to the third party, and wherein the response comprises an indication that the email message has been authenticated.

9. The computer-implemented method of claim 1, wherein receiving the information from the first party comprises receiving from the first party a message body of the email message as part of the information.

10. The computer-implemented method of claim 1, wherein the response comprises authentication instructions, the authentication instructions to be acted upon by a computer of the first party in order to authenticate the email message.

11. The computer-implemented method of claim 10, wherein the authentication instructions comprise an identifier of a specific sender policy framework (SPF) record to be accessed by the computer of the first party in order to authenticate the email message.

12. The computer-implemented method of claim 1, wherein identifying the third party comprises identifying a sending edge mail transfer agent (MTA), and wherein processing the electronic record to determine whether the electronic record explicitly identifies the third party as authorized to send email messages on behalf of the second party further comprises determining whether the electronic record explicitly identifies the sending edge MTA.

13. The computer-implemented method of claim 1, wherein the second party is an individual and wherein retrieving the electronic record comprises identifying an electronic record specific to the individual, and retrieving the electronic record specific to the individual.

14. The computer-implemented method of claim 1, wherein the second party is an entity and wherein retrieving the electronic record comprises identifying an electronic record specific to a domain associated with the entity, and retrieving the electronic record specific to the domain associated with the entity.

15. The computer-implemented method of claim 1, wherein the electronic record comprises information identifying a sender policy framework (SPF) record.

16. The computer-implemented method of claim 1, wherein the electric record is a sender policy framework (SPF) record.

17. The computer-implemented method of claim 1, wherein the email message is a first email message, and wherein:
receiving the information comprises receiving, in bulk, information sets, each information set representing a plurality of email headers associated with a respective one of a plurality of email messages received by the first party, the plurality including the first email message, wherein each of the email messages in the plurality is received from a respective third party and purports to be sent by the respective third party on behalf of a respective second party;
the computer-implemented method further comprises, for each email message of the plurality, from a corresponding one of the information sets, identifying the respective second party and the respective third party, and retrieving an electronic record associated with the respective second party, and processing the electronic record associated with the respective second party to determine whether the electronic record associated with the respective second party explicitly identifies the respective third party as authorized to send email messages on behalf of the respective second party; and the response comprises information identifying each one of the email messages in the plurality for which the respective third party is determined to be authorized to send messages on behalf of the respective second party.

18. The computer-implemented method of claim 1, wherein:

identifying the second party comprises identifying from the information content of a FROM:

header, and identifying the second party in dependence on said content.

19. A computer-implemented method, comprising:

receiving via a wide area network (WAN) from a first party information representing a plurality of email headers associated with an email message received by the first party, wherein the email message is received from a third party, wherein the email message purports to be sent by the third party on behalf of a second party;

from the information, identifying the second party and the third party;

accessing a validation database, and retrieving and processing an electronic record from the validation database, the electronic record associated with the second party, to determine whether the electronic record explicitly identifies the third party as authorized to send email messages on behalf of the second party; and in response to a determination that the electronic record explicitly identifies the third party as authorized to send email messages on behalf of the second party, transmitting via the WAN a response to the first party, wherein the response indicates that the third party is authorized to send the email message on behalf of the second party.

20. The computer-implemented method of claim 19, wherein:

receiving the information from the first party also comprises receiving a message body of the email message;

the computer-implemented method further comprises, in response to the determination, authenticating the email message; and transmitting the response comprises transmitting, in encrypted form to the first party, information which encapsulates the message body and which also indicates that the email message has been authenticated.

21. The computer-implemented method of claim 19, wherein the computer-implemented method further comprises determining whether the email message was sent to the first party by the third party, and wherein the response is further dependent on a determination that the email message was sent to the first party by the third party.

22. An apparatus comprising:

at least one server;

memory to store a validation database; and instructions stored on non-transitory machine-readable media where said instructions when executed are to cause the at least one server to receive from a wide area network (WAN) from a first party information representing a plurality of email headers associated with an email message received by the first party, wherein the email message purports to be sent to the first party by the third party on behalf of a second party;

identify, from the information, the second party and the third party;

access the validation database, to retrieve an electronic record from the database, the electronic record associated with the second party;

process the electronic record to determine whether the electronic record explicitly identifies the third party as authorized to send email messages on behalf of the second party; and transmit, in response to a determination that the electronic record explicitly identifies the third party as authorized to send email messages on behalf of the second party, a response to the first party, via a WAN, wherein the response indicates that the third party is authorized to send the email message on behalf of the second party.

* * * * *